United States Patent
Negi et al.

(10) Patent No.: US 10,749,683 B2
(45) Date of Patent: Aug. 18, 2020

(54) TECHNOLOGIES FOR END-TO-END BIOMETRIC-BASED AUTHENTICATION AND PLATFORM LOCALITY ASSERTION

(71) Applicant: Intel Corporation, Santa Clara, CA (US)

(72) Inventors: Ansuya Negi, Beaverton, OR (US); Nitin V. Sarangdhar, Portland, OR (US); Ulhas S. Warrier, Beaverton, OR (US); Ramkumar Venkatachary, Portland, OR (US); Ravi L. Sahita, Beaverton, OR (US); Scott H. Robinson, Portland, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 16/133,952

(22) Filed: Sep. 18, 2018

(65) Prior Publication Data

US 2019/0036699 A1    Jan. 31, 2019

Related U.S. Application Data

(62) Division of application No. 14/974,893, filed on Dec. 18, 2015, now Pat. No. 10,079,684.

(60) Provisional application No. 62/239,377, filed on Oct. 9, 2015.

(51) Int. Cl.
H04L 9/32 (2006.01)
H04L 9/08 (2006.01)

(52) U.S. Cl.
CPC .......... *H04L 9/3231* (2013.01); *H04L 9/0816* (2013.01); *H04L 9/0825* (2013.01)

(58) Field of Classification Search
CPC ..................................................... H04L 9/3231
See application file for complete search history.

(56) References Cited

U.S. PATENT DOCUMENTS

| 7,536,598 B2* | 5/2009 | Largman | G06F 11/1417 714/13 |
| 2015/0304736 A1* | 10/2015 | Lal | G06F 21/10 380/210 |

* cited by examiner

*Primary Examiner* — Simon P Kanaan
(74) *Attorney, Agent, or Firm* — Barnes & Thornburg LLP

(57) ABSTRACT

Technologies for end-to-end biometric-based authentication and locality assertion include a computing device with one or more biometric devices. The computing device may securely exchange a key between a driver and a secure enclave. The driver may receive biometric data from the biometric sensor in a virtualization-protected memory buffer and encrypt the biometric data with the shared key. The secure enclave may decrypt the biometric data and perform a biometric authentication operation. The computing device may measure a virtual machine monitor (VMM) to generate attestation information for the VMM. A secure enclave may execute a virtualization report instruction to request the attestation information. The processor may copy the attestation information into the secure enclave memory. The secure enclave may verify the attestation information with a remote attestation server. If verified, the secure enclave may provide a shared secret to the VMM. Other embodiments are described and claimed.

17 Claims, 7 Drawing Sheets

```
IF VMXOFF
        THEN NO-OP;
        ELSE IF executed outside VMX non-root operation.
                THEN #UD;
        ELSE IF "Enable VMM locality report" VM-execution control is 0.
                THEN NO-OP;
        FI;
FI;

//VMX ON,EREPORTVMX activated and EREPORTVMX executed by VMX guest code
IF RIP NOT IN ELRANGE
        THEN NO-OP;
        ELSE IF ENCLAVE.CAP does not include EREPORTVMX_CAP
                THEN #GP;
FI;

//VMX ON,EREPORTVMX activated and EREPORTVMX executed by valid SGX enclave
IF EAX==1
        THEN
                EAX ← 4 bytes from VMCS-address + VMCS-field;
                REP MOVS Quote blob from [EAX] into enclave memory specified in
                              [EBX]
                Set ECX with some qualifier for the blob (version, nonce, etc.)
                FI
        ELSE
                #GP
FI;
```

FIG. 10

TECHNOLOGIES FOR END-TO-END BIOMETRIC-BASED AUTHENTICATION AND PLATFORM LOCALITY ASSERTION

CROSS-REFERENCE TO RELATED APPLICATIONS

The present application is a divisional application of U.S. application Ser. No. 14/974,893, entitled "TECHNOLOGIES FOR END-TO-END BIOMETRIC-BASED AUTHENTICATION AND PLATFORM LOCALITY ASSERTION," which was filed on Dec. 18, 2015 and which issued as U.S. Pat. No. 10,079,684 on Sep. 18, 2018, and which claimed priority under 35 U.S.C. § 119(e) to U.S. Provisional Patent Application Ser. No. 62/239,377, entitled "TECHNOLOGIES FOR END-TO-END BIOMETRIC-BASED AUTHENTICATION AND PLATFORM LOCALITY ASSERTION," which was filed on Oct. 9, 2015.

BACKGROUND

Typical operating systems (OS) may have a large attack surface, and have used various processor capabilities to harden the existing attack surface (for example, using ASLR, XD, SMEP and SMAP). Certain current operating systems attempt to reduce the attack surface by minimizing code operating at the highest privilege level, and reducing the reachability of unwanted code, using platform integrity monitors/virtual machine monitors (VMMs) that have a relatively small attack surface and use processor virtualization. These security-focused VMMs may partition OS software operating at the highest guest software privilege level of the processor (e.g., ring-0) with minimal latency/overheads.

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. SGX operates in ring-3 (a lower privilege mode of the processor). Thus, SGX may allow untrusted OS/VMMs to host trusted execution environments without the risk of loss of confidentiality from attacks in the OS/VMM.

Facial recognition is a common biometric authentication factor. For example, a Biometric Context Agent (BCA) service may use biometric factors such as facial recognition, along with a device identifier, to allow a user to log into a device. Other biometric factors such as fingerprint and iris recognition may have better false acceptance rates (FAR) and false rejection rates (FRR) than facial recognition. Fingerprint recognition may require about 20 points for recognition; iris recognition may be even better and have more than 240 points for recognition.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 10 is pseudocode illustrating at least one embodiment of the method of FIG. 9.

DETAILED DESCRIPTION OF THE DRAWINGS

Figure 1:
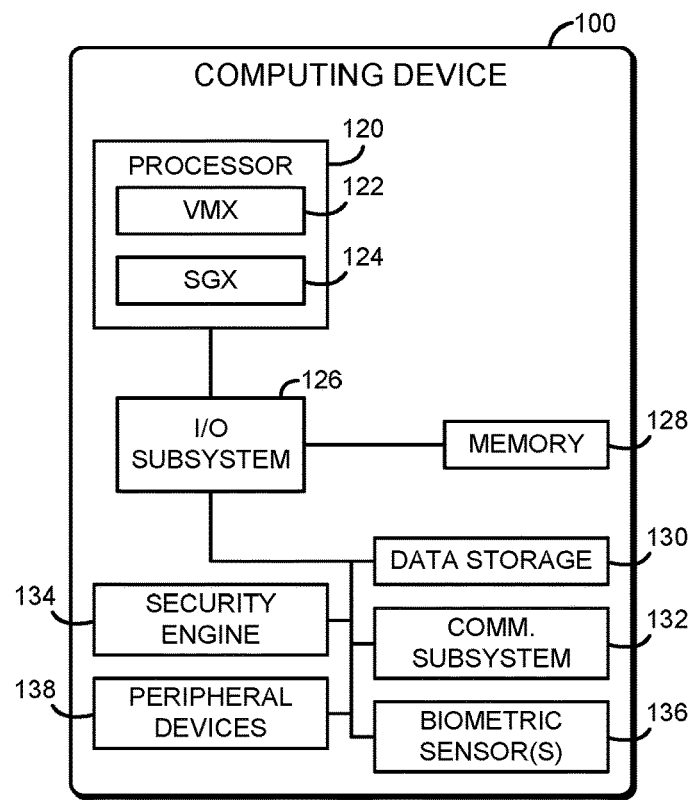
FIG. 1 is a simplified block diagram of at least one embodiment of a computing device for biometric authentication and platform locality assertion.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for end-to-end biometric authentication and platform locality assertion includes, among other components, a processor 120 supporting both virtualization technology (e.g., Intel® VT-x and VT-d technology) and secure enclaves, (e.g., Intel® SGX). In use, as described further below, the computing device 100 secures biometric data captured using one or more biometric sensors, such as iris recognition cameras, using virtualization-based VTIO (Virtual Technology based Input/Output) protection. The computing device 100 uses secure enclaves to protect the biometric template creation and identification processes. Thus, at no point can the captured biometric data be snooped by malware, thus protecting user privacy. Additionally, the computing device 100 may also ensure that the biometric data is indeed coming from a biometric sensor of the computing device 100, which may give a high degree of confidence about the liveness of the input. Although illustratively described in embodiments using iris recognition in the context of biometric authentication, it should be understood that the technology of the computing device 100 may provide end-to-end security for any I/O data to be secured between an I/O device and code executing in a secure enclave.

Additionally or alternatively, in some embodiments, the computing device 100 may provide one or more processor 120 instructions to bind the locality of a secure enclave on the computing device 100 to a virtual machine monitor (VMM) that may be measured by another hardware root of trust on the same computing device 100. Thus, the computing device 100 enables a capability to distribute a shared secret between an enclave and a VMM. The computing device 100 may provide flexibility for systems software and secure enclave software to be able to implement various security models without adding to the trusted computing base (TCB) of the computing device (e.g., the VMM and/or enclave). For example, a VMM-protected device driver may provide encrypted device data to a secure enclave module that processes the encrypted data (and decrypts it with confidentiality from OS attacks). Such a model may block the largest attack surface in the OS and can securely bind critical platform devices protected via a VMM to secure enclave software components.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 126, a memory 128, a data storage device 130, and communication circuitry 132. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122 and secure enclave support 124.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. A hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. In some embodiments, the processor 120 may also support hardware-assisted translation of guest-physical memory addresses to physical addresses and memory access permissions for direct-memory access (DMA) capable I/O devices. The hardware virtualization support 122 may be embodied as, for example, Intel® VT-x technology and/or Intel® VT-d technology.

The secure enclave support 124 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 128. The secure enclave support 124 may be embodied as a set of processor instruction extensions that allows the processor 120 to establish one or more secure enclaves in the memory 128. For example, the secure enclave support 124 may be embodied as Intel® Software Guard Extensions (SGX) technology.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. In some embodiments, the data storage device 130 may be used to store the contents of one or more secure enclaves. When stored by the data storage device 130, the contents of the secure enclave may be encrypted to prevent unauthorized access.

The communication circuitry 132 of the computing device 100 may be embodied as any communication circuit, device, or collection thereof, capable of enabling communications between the computing device 100 and other remote devices over a network. The communication circuitry 132 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include a security engine 134, which may be embodied as any hardware component(s) or circuitry capable of providing security-related services to the computing device 100. In particular, the security engine 134 may include a microprocessor, microcontroller, or other embedded controller capable of executing firmware and/or other code independently and securely from the processor 120. Thus, the security engine 134 may be used to establish a hardware root of trust for the computing device 100. The security engine 134 may communicate with the processor 120 and/or other components of the computing device 100 over a dedicated bus, such as a host embedded controller interface (HECI). The security engine 134 may also provide remote configuration, control, or management of the computing device 100. In the illustrative embodiment, the security engine 134 is embodied as a converged security and manageability engine (CSME) incorporated in a system-on-a-chip (SoC) of the computing device 100. In some embodiments, the security engine 134 may be embodied as a manageability engine, an out-of-band processor, a Trusted Platform Module (TPM), or other security engine device or collection of devices. Further, in some embodiments, the security engine 134 is also capable of communicating using the communication circuitry 132 or a dedicated communication circuit independently of the state of the computing device 100 (e.g., independently of the state of the main processor 120), also known as "out-of-band" communication.

As shown, the computing device 100 may also include one or more biometric sensors 136 and peripheral devices 138. The biometric sensors 136 may include any number of biometric authentication devices such as an iris scanner/camera, a facial recognition camera, a fingerprint reader, and/or other biometric authentication devices. Similarly, the peripheral devices 138 may include any number of additional input/output devices, interface devices, and/or other peripheral devices. For example, in some embodiments, the peripheral devices 138 may include a display, touch screen, graphics circuitry, keyboard, mouse, speaker system, microphone, network interface, and/or other input/output devices, interface devices, and/or peripheral devices.

Figure 2:
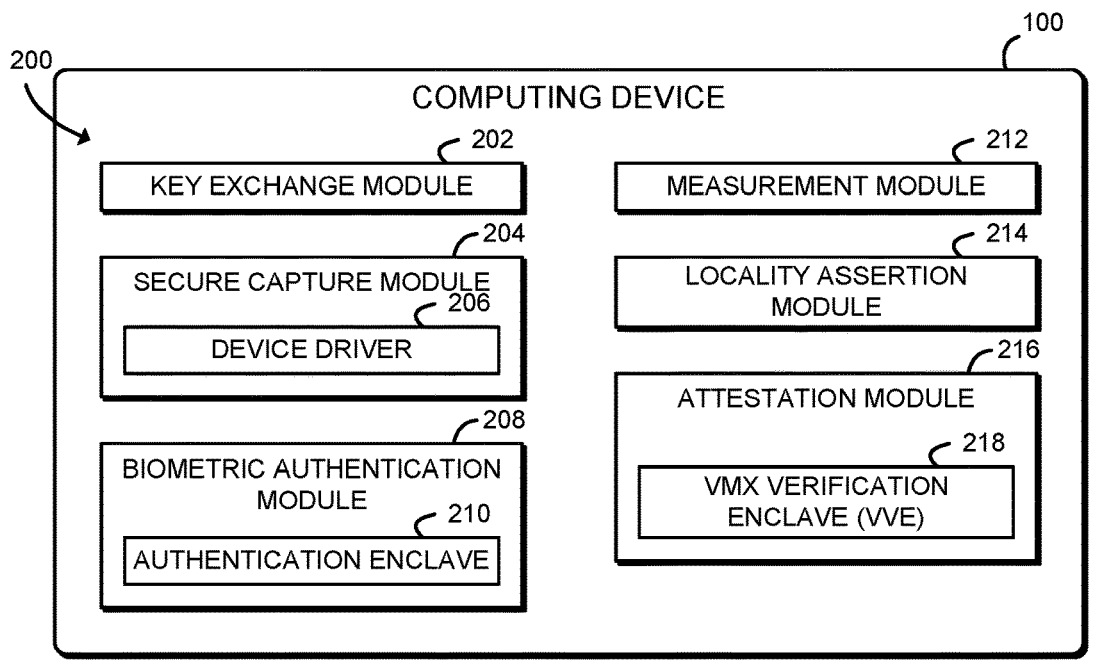
FIG. 2 is a simplified block diagram of at least one embodiment of an environment that may be established by a computing device of FIG. 1.

Referring now to FIG. 2, in an illustrative embodiment, the computing device 100 establishes an environment 200 during operation. The illustrative environment 200 includes a key exchange module 202, a secure capture module 204, a biometric authentication module 208, a measurement module 212, a locality assertion module 214, and an attestation module 216. The various modules of the environment 200 may be embodied as hardware, firmware, microcode, software, or a combination thereof. As such, in some embodiments, one or more of the modules of the environment 200 may be embodied as circuitry or collection of electrical devices (e.g., key exchange circuitry 202, secure capture circuitry 204, biometric authentication circuitry 208, measurement circuitry 212, locality assertion circuitry 214, and/or attestation circuitry 216). It should be appreciated that, in such embodiments, one or more of the key exchange circuitry 202, the secure capture circuitry 204, the biometric authentication circuitry 208, the measurement circuitry 212, the locality assertion circuitry 214, and/or the attestation circuitry 216 may form a portion of one or more of the processor 120, the I/O subsystem 126, and/or other components of the computing device 100. Additionally, in some embodiments, one or more of the illustrative modules may form a portion of another module and/or one or more of the illustrative modules may be independent of one another.

The key exchange module 202 is configured to securely exchange a shared key between a biometric device driver 206 of the computing device 100 and an authentication secure enclave 210 of the computing device. The authentication secure enclave 210 is established with secure enclave support 124 of the processor 120.

The secure capture module 204 is configured to receive, by the biometric device driver 206, biometric data from a biometric device 136 of the computing device in a virtualization-protected memory buffer. The virtualization-protected memory buffer is secured by hardware virtualization support 122 of the processor 120. The secure capture module 204 is further configured to encrypt, by the biometric device driver 206, the biometric data with the shared key to generate encrypted biometric data. The shared key used by the biometric device driver 206 is also secured by the hardware virtualization support 122 of the processor 120, and in some embodiments the encryption method, function, or other encryption algorithm may also be secured by the hardware virtualization support 122. In some embodiments, the secure capture module 204 may be configured to perform additional encryption operations for the captured biometric data, such as integrity protection and/or replay protection. The secure capture module 204 may be further configured to allocate the virtualization-protected memory buffer in a memory range that is inaccessible to an operating system of the computing device, for example using extended page table support of the processor 120. The secure capture module 204 may be further configured to allocate the virtualization-protected memory buffer in a memory range that is inaccessible to I/O devices other than the assigned biometric device 136 (e.g., other biometric devices 136 or peripheral devices 138) via direct memory access (DMA) operations.

The biometric authentication module 208 is configured to decrypt, by the authentication secure enclave 210, the encrypted biometric data with the shared key, and perform, by the authentication secure enclave 210, a biometric authentication operation based on the biometric data. The biometric authentication operation may be embodied as an enrollment process or an identification process.

The measurement module 212 is configured to measure a virtual machine monitor of the computing device 100 to generate virtual machine monitor attestation data. The measurement module 212 may be configured to measure the virtual machine monitor by a trusted firmware component of the computing device 100 and store the virtual machine monitor attestation data using the security engine 134, for example in a trusted platform module of the computing device 100.

The locality assertion module 214 is configured to execute, by a VMX verification enclave (VVE) 218 of the computing device 100, a virtualization report instruction with the processor 120. The VVE 218 is established with the secure enclave support 124 of the processor 120. The locality assertion module 214 is further configured to copy the virtual machine monitor attestation data into secure enclave memory of the VVE 218 in response to executing the virtualization report instruction. The locality assertion module 214 may be further configured to enable a non-exiting capability of the processor 120 associated with the virtualization report instruction. In some embodiments, the locality assertion module 214 may be further configured to determine whether the VVE 218 is permitted to execute the virtualization report instruction before copying the virtual machine monitor attestation information. The locality assertion module 214 may be further configured to execute, by the VVE 218, a virtualization set key instruction with the processor 120 and copy a shared secret from the secure enclave memory of the VVE 218 to the virtual machine monitor in response to executing the virtualization set key instruction.

The attestation module 216 is configured to perform, by the VVE 218, a remote attestation operation based on the virtual machine monitor attestation data.

Figure 3:
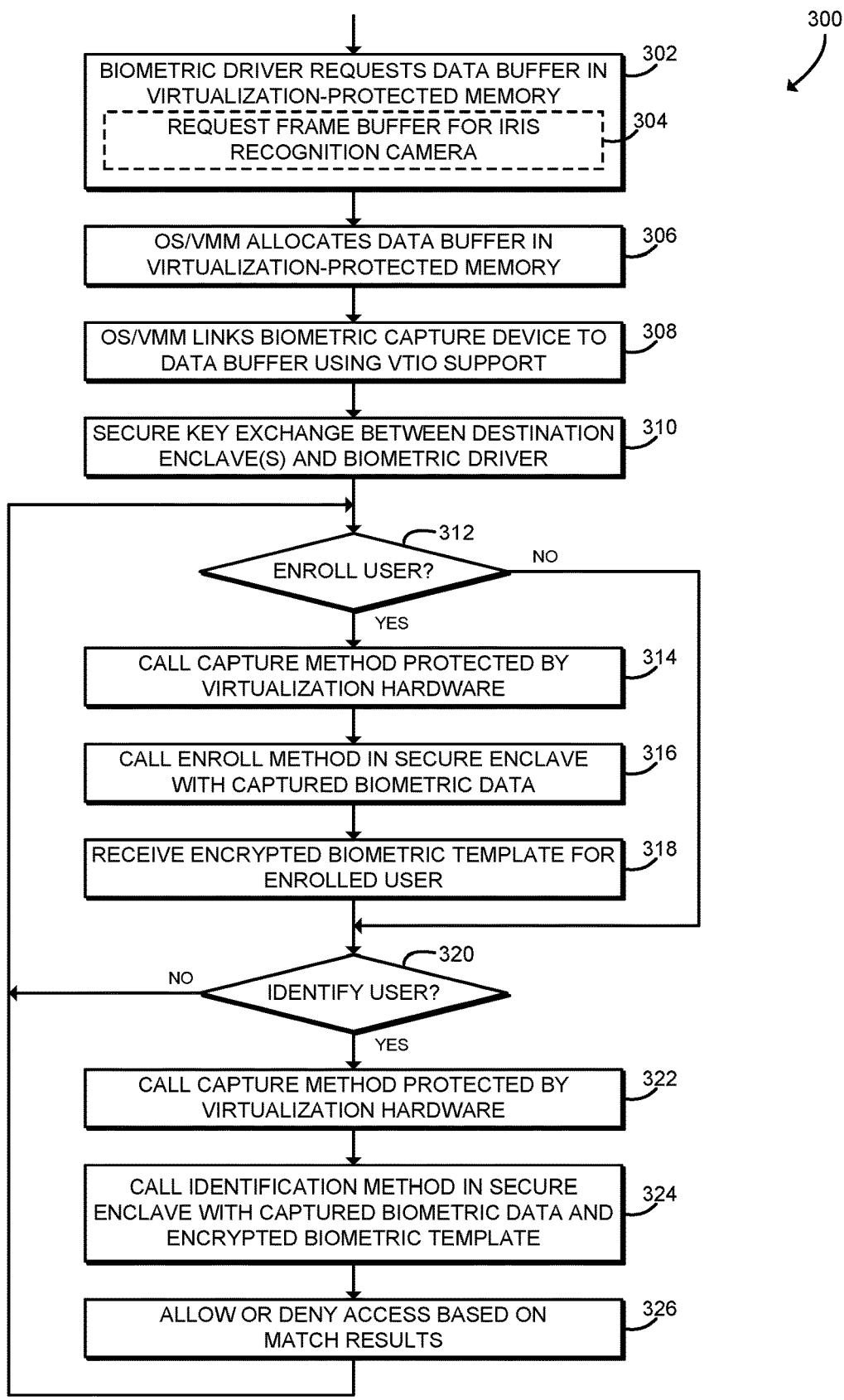
FIG. 3 is a simplified flow diagram of at least one embodiment of a method for biometric authentication that may be executed by the computing device of FIGS. 1-2.

Referring now to FIG. 3, in use, the computing device 100 may execute a method 300 for biometric authentication. The method 300 begins in block 302, in which the biometric device driver 206 of the computing device 100 requests a data buffer in a virtualization-protected range of the memory 128. As described below, the data buffer will be used to store biometric data generated by one or more biometric sensors 136. The biometric sensor 136 may be embodied as a facial recognition camera, iris recognition camera, fingerprint reader, or any other biometric interface device. In some embodiments, in block 304, the biometric device driver 206 may request a frame buffer to store frame data captured by an iris recognition camera 136.

In block 306, an operating system and/or virtual machine monitor (VMM) of the computing device 100 allocates a data buffer in the virtualization-protected range of the memory 128. For example, the VMM may allocate the data buffer in a range of physical memory that is not mapped or otherwise accessible to an operating system or other guest-level software of the computing device 100. In some embodiments, the computing device 100 may configure one or more page tables and/or extended page tables to protect the data buffer. In particular, the computing device 100 may use Intel® VT-x technology to protect the data buffer.

In block 308, the operating system and/or VMM links a biometric capture device 136 to the data buffer using virtualization I/O support of the processor 120, such as the virtualization support 122. For example, the operating system and/or the VMM may set up one or more page tables, extended page tables, I/O memory management units, or other components of the computing device 100 to allow the biometric capture device 136 to write direct memory access (DMA) data directly to the data buffer.

In block 310, the computing device 100 performs a secure key exchange between one or more destination secure enclaves and the biometric device driver 206. For example, the secure key exchange may be performed between the biometric device driver 206 and the authentication enclave 210. The computing device 100 may use any technique to securely establish a shared session key between the destination secure enclaves and the biometric device driver 206 that may be used to protect the biometric data captured by the biometric sensor 136. One potential embodiment of a method for secure key exchange between the authentication enclave 210 and the biometric device driver 206 is described below in connection with FIG. 4.

In block 312, the computing device 100 determines whether to enroll a user for biometric authentication. For example, the computing device 100 may determine whether a new user is configuring a biometric authentication factor such as iris recognition. If not, the method 300 branches ahead to block 320. If the computing device 100 determines to enroll a user for biometric authentication, the method 300 advances to block 314.

In block 314, the computing device 100 calls a capture method protected by hardware virtualization support 122 of the processor 120 to capture biometric data. The capture method may capture biometric data from a biometric sensor 136 into the data buffer protected by the hardware virtualization support 122 and then encrypt the biometric data. The encrypted biometric data may be made available to the guest operating system. One potential embodiment of a method for secure capture of biometric data using virtualization support 122 is described below in connection with FIG. 5.

In block 316, the computing device 100 calls an enroll method protected by the authentication enclave 210. The enroll method may be embodied as or otherwise included in a third-party library or other user-level code of the computing device 100, and is protected using the secure enclave support 124 of the processor 120. The computing device 100 supplies the enroll method with the encrypted biometric data captured as described above in connection with block 314. The enroll method analyzes the captured biometric data and generates an encrypted biometric template that may be used for user identification. Because the biometric data analysis and template generation process is protected by the authentication enclave 210, the biometric template may be protected against all software attacks and simple hardware attacks. One potential embodiment of the enroll method is described below in connection with FIG. 6. In block 318, after executing the enroll method, the computing device 100 receives an encrypted biometric template for the enrolled user. The encrypted biometric template may be stored by an application, operating system, or other component of the computing device 100 that may perform biometric authentication.

In block 320, the computing device 100 determines whether to identify a user using biometric authentication. The computing device 100 may identify the user, for example, in response to an attempt to log on to the computing device 100, access an application, or otherwise access resources of the computing device 100. If the computing device 100 determines not to identify the user, the method 300 loops back to block 312, in which the computing device 100 may perform additional biometric authentication operations. If the computing device 100 determines to identify the user, the method 300 advances to block 322.

In block 322, the computing device 100 calls a capture method protected by hardware virtualization support 122 of the processor 120 to capture biometric data. As described above, the capture method may capture biometric data from a biometric sensor 136 into the data buffer protected by the hardware virtualization support 122 and then encrypt the biometric data. The encrypted biometric data may be made available to the guest operating system. One potential embodiment of a method for secure capture of biometric data using virtualization support 122 is described below in connection with FIG. 5.

In block 324, the computing device 100 calls an identification method protected by the authentication enclave 210. The identification method may be embodied as or otherwise included in a third-party library or other user-level code of the computing device 100, and is protected using the secure enclave support 124 of the processor 120. The computing device 100 supplies the identification method with the biometric data captured as described above in connection with block 322 as well as an encrypted biometric template generated during enrollment as described above in connection with block 318. The identification method may return match results that indicate whether the biometric data matches the supplied biometric template. The identification method may also return an updated encrypted biometric template. Because the biometric matching and template update processes are protected by the authentication enclave 210, the biometric template may be protected against all software attacks and simple hardware attacks. One potential embodiment of the identification method is described below in connection with FIG. 7.

In block 326, the computing device 100 allows or denies access based on the match results received from the identification method. For example, the computing device 100 may allow the user to log on, access an application, or access other resources of the computing device 100 in response to a successful match between the biometric data and the biometric template. After allowing or denying access, the method 300 loops back to block 312, in which the computing device 100 may perform additional biometric authentication operations.

Figure 4:
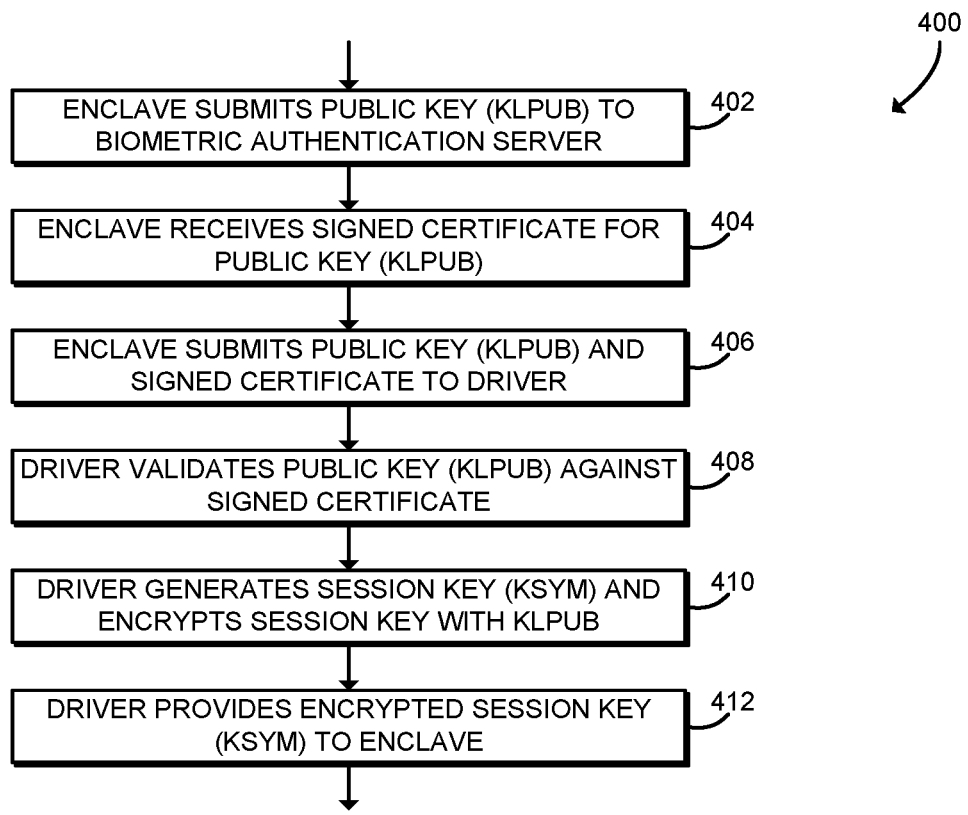
FIG. 4 is a simplified flow diagram of at least one embodiment of a method for secure key exchange that may be executed by the computing device of FIGS. 1-2.

Referring now to FIG. 4, in use, the computing device 100 may execute a method 400 for secure key exchange between the authentication enclave 210 and the biometric device driver 206. Although illustratively exchanged between the enclave 210 and the driver 206, it should be understood that techniques described in the method 400 may also be used for other secure enclaves and/or device drivers. The method 400 begins in block 402, in which the authentication enclave 210 generates a public/private key pair (KlPub/KlPri) and submits the public key (KlPub) to a biometric authentication server for signing. In block 404, the enclave 210 receives a signed certificate from the biometric authentication sever. The certificate may be signed with a root public key of the biometric authentication server (KSpub).

In block 406, the enclave 210 provides the public key (KlPub) to the biometric device driver 206, along with the certificate signed by the biometric authentication server. In block 408, the driver 206 validates the public key KlPub by validating the key against the certificate. The driver 206 recognizes the biometric authentication server used for signing. For example, the root public key (KSpub) used for certificate signing may be hardcoded in the driver 206.

In block 410, the driver 206 generates a session key, which may be embodied as a symmetric encryption/decryption shared key (Ksym). The driver 206 encrypts the shared key using the public key (KlPub) provided by the enclave 210. In block 412, the driver 206 provides the encrypted session key (Ksym) to the authentication enclave 210. Only the authentication enclave 210 has access to the corresponding private key (KlPri) and, thus, the authentication enclave 210 is the only entity capable of deriving the shared key Ksym. After exchanging the session key Ksym, the method 400 is completed. Once the initial key distribution handshake is completed, the driver 206 may encrypt biometric data before releasing it to the authentication enclave 210, ensuring that captured biometric data remains secure.

Figure 5:
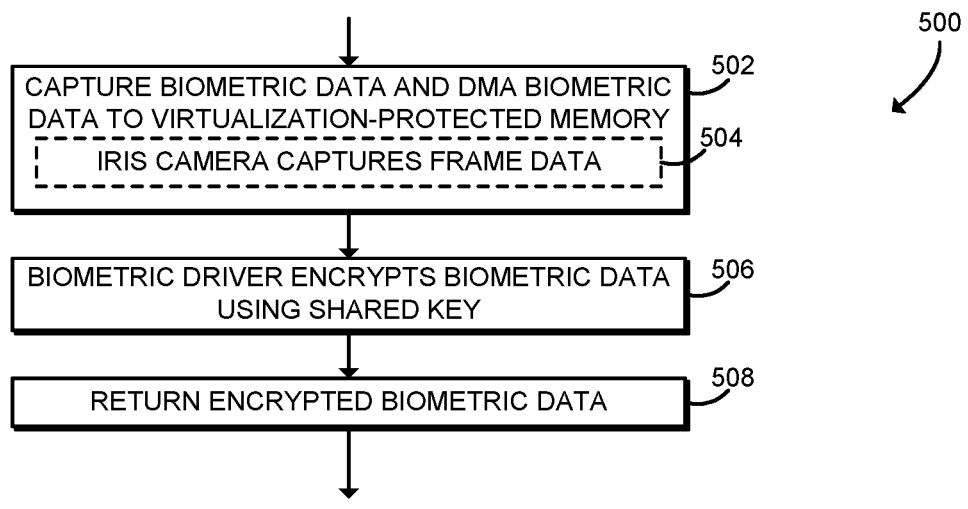
FIG. 5 is a simplified flow diagram of at least one embodiment of a method for secure biometric data capture that may be executed by the computing device of FIGS. 1-2.

Referring now to FIG. 5, in use, the computing device 100 may execute a method 500 for secure biometric data capture. The method 500 begins in block 502, in which a biometric sensor 136 of the computing device 100 captures biometric data and copies the biometric data using one or more direct memory access (DMA) operations into a virtualization-protected memory buffer. For example, as described above, the memory buffer may be allocated in a range of physical memory that is not mapped or otherwise accessible to an operating system or other guest-level software of the computing device 100. The biometric sensor 136 (and/or one or more related I/O controllers) may be configured to have DMA access to the memory buffer using the virtualization support 122 of the processor 120. For example, one or more page tables may be configured to provide the biometric sensor 136 direct access to the memory buffer. The page tables or other structures may also be configured to prevent unauthorized access to the memory buffer by other devices (e.g., other biometric devices 136, peripheral devices 138, and/or other I/O devices). Thus, the virtualization support 122 protects the biometric data from unauthorized access by guest-level software such as an operating system of the computing device. In some embodiments, the biometric sensor 136 may write the biometric data using a direct memory access (DMA) operation into a memory buffer protected using Intel® VT-d technology. As described above, the biometric sensor 136 may be embodied as a facial recognition camera, iris recognition camera, fingerprint reader, or any other biometric interface device. In some embodiments, in block 504, an iris recognition camera 136 may capture frame data and write the frame data using a DMA operation into a virtualization-protected frame buffer.

In block 506, the biometric device driver 206 encrypts the biometric data using a shared key to generate encrypted biometric data. The shared encryption key may be shared with the authentication enclave 210 using a secure key exchange, as described above in connection with block 310 of FIG. 3. The shared encryption key and the associated encryption algorithm (e.g., the encryption function, method, or other process) are protected by the hardware virtualization support 122 of the processor 120. For example, the encryption key and associated encryption code may be stored in a range of memory that is not accessible to an operating system or other guest-level software of the computing device 100. Thus, any guest-level malware executing on the computing device 100 is not able to observe or modify the encryption key or the encryption code that uses the encryption key.

In block 508, the biometric device driver 206 returns the encrypted biometric data to the caller, which may be embodied an application, operating system, destination enclave, or other component of the computing device 100 that may use the encrypted biometric data for authentication operations. After returning the encrypted biometric data, the method 500 is completed. As described above in connection with FIG. 3, the computing device 100 may use the encrypted biometric data for a biometric operation such as the enroll method and/or the identification method. Thus, the computing device 100 protects the input path originating from biometric devices 136 to the application that processes the biometric data. The processing of the biometric data may be performed by any third-party or other user-level code running in a secure enclave in the standard, guest-level operating system environment and thus may be outside of the trusted computing base (TCB) of the virtualization I/O based protection.

Figure 6:
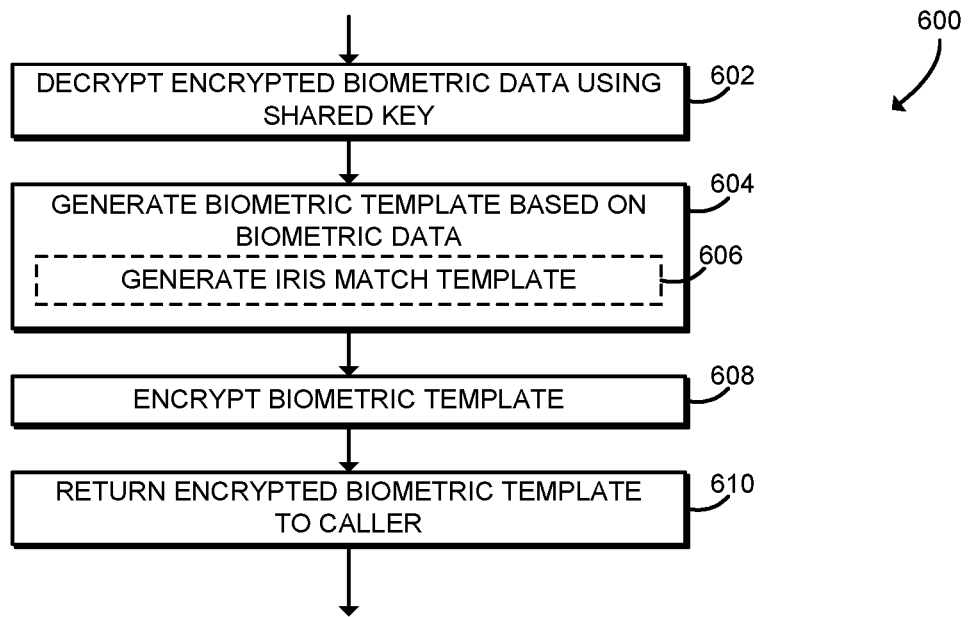
FIG. 6 is a simplified flow diagram of at least one embodiment of a method for biometric enrollment that may be executed by the computing device of FIGS. 1-2.

Referring now to FIG. 6, in use, the computing device 100 may execute a method 600 for biometric enrollment. The method 600 may execute in a secure enclave protected by the secure enclave support 124 of the processor 120, such as the authentication enclave 210. The method 600 begins in block 602, in which the computing device 100 decrypts encrypted biometric data using a shared key. As described above, the encrypted biometric data may be captured from a biometric device 136 in a data buffer protected using the virtualization support 122 and then encrypted by the biometric device driver 206. The shared encryption key may be shared with the biometric device driver 206 during a secure key exchange as described above in connection with block 310 of FIG. 3.

In block 604, the computing device 100 generates a biometric template based on the biometric data. As described below, the biometric template may be used to match against input biometric data to authenticate a user. For example, the input biometric data may be generated by any biometric interface device, such as a facial recognition camera, an iris recognition camera, a fingerprint reader, or other biometric device. The computing device 100 may use any appropriate biometric authentication algorithm to generate the biometric template. In some embodiments, in block 606, the computing device 100 may generate an iris match template for use with an iris recognition camera 136.

In block 608, the computing device 100 encrypts the biometric template to generate an encrypted biometric template. The computing device 100 may encrypt the biometric template with an encryption key that is a secret of the authentication enclave 210. Thus, the encrypted biometric template may be sealed to the authentication enclave 210 and may not be accessed by untrusted components of the computing device 100, such as the operating system.

In block 610, the computing device 100 returns the encrypted biometric template to the caller, which may be embodied as an application, operating system, or other component of the computing device 100 that may use the biometric template for authentication operations. After returning the encrypted biometric template, the method 600 is completed. As described above in connection with FIG. 3, the computing device 100 may use the encrypted biometric template to perform biometric identification.

Figure 7:
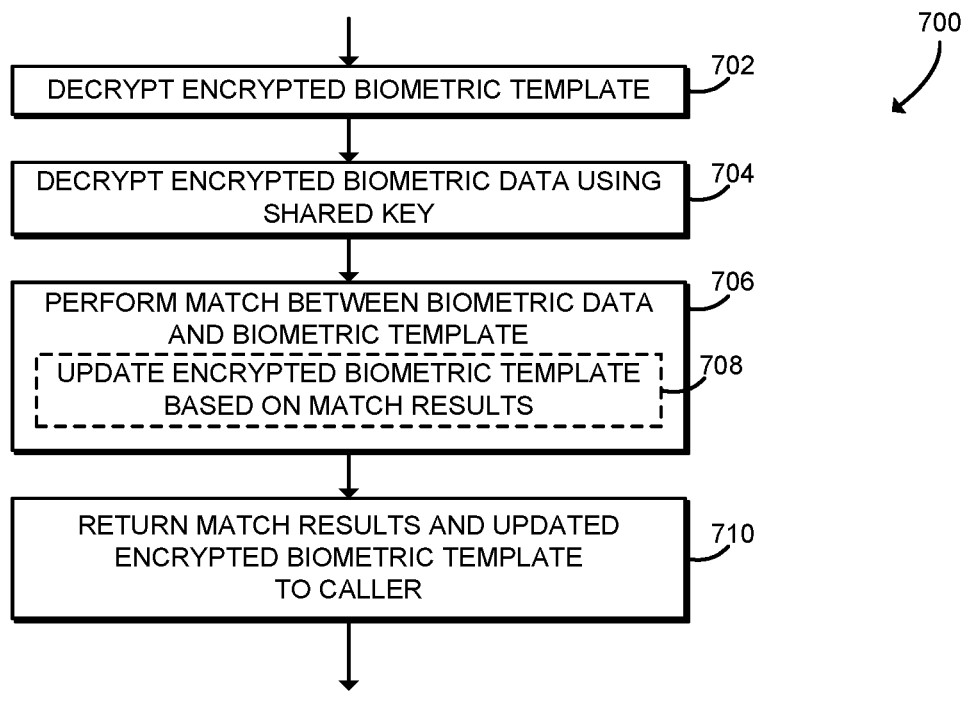
FIG. 7 is a simplified flow diagram of at least one embodiment of a method for biometric identification that may be executed by the computing device of FIGS. 1-2.

Referring now to FIG. 7, in use, the computing device 100 may execute a method 700 for biometric identification. The method 700 may execute in a secure enclave protected by the secure enclave support 124 of the processor 120, such as the authentication enclave 210. The method 700 begins in block 702, in which the computing device 100 decrypts an encrypted biometric template to recover an unencrypted biometric template. The encrypted biometric template may be generated by the enroll method as described above in connection with FIG. 6. Thus, the computing device 100 may decrypt or otherwise unseal the encrypted biometric template using an encryption key that is a secret of the authentication enclave 210.

In block 704, the computing device 100 decrypts encrypted biometric data using a shared key. As described above, the encrypted biometric data may be captured from a biometric device 136 in a data buffer protected using the virtualization support 122 and then encrypted by the biometric device driver 206. The shared encryption key may be shared with the biometric device driver 206 during a secure key exchange as described above in connection with block 310 of FIG. 3. The decrypted biometric data may represent an input frame of biometric data (e.g., iris recognition camera data) that may be used to identify a user.

In block 706, the computing device 100 performs a match between the biometric data and the biometric template. The computing device 100 may use any appropriate biometric authentication algorithm to determine whether the input biometric data matches the biometric template. For example, the computing device 100 may perform an iris matching algorithm to determine whether input iris recognition camera data matches the biometric template. In some embodiments, in block 708, the computing device 100 may update the encrypted biometric template based on the match results. For example, the computing device 100 may update the biometric template to improve matching and then seal the biometric template to the authentication enclave 210 as described above in connection with block 608 of FIG. 6.

In block 710, the computing device 100 returns the match results and, in some embodiments, the updated encrypted biometric template to the caller. The caller may be embodied as an application, operating system, or other component of the computing device 100 that may use the biometric template for authentication operations. After returning the match results, the method 700 is completed. As described above in connection with FIG. 3, the computing device 100 may use the match results to determine whether to allow or deny access to an application, operation system, hardware component, or other resources of the computing device 100.

Figure 8:
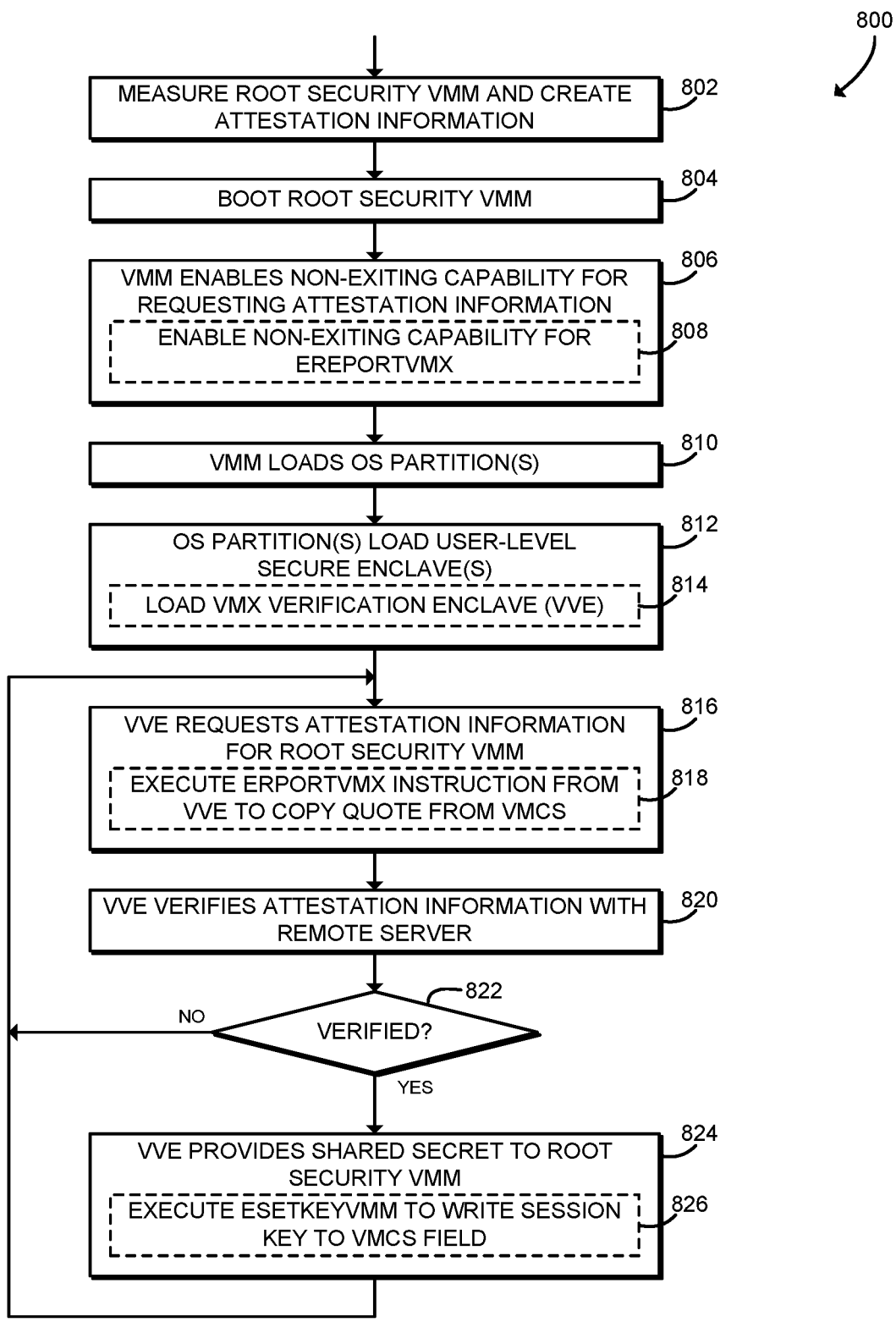
FIG. 8 is a simplified flow diagram of at least one embodiment of a method for locality assertion that may be executed by the computing device of FIGS. 1-2.

Referring now to FIG. 8, in use, the computing device 100 may execute a method 800 for locality assertion. The method 800 begins in block 802, in which the computing device 100 measures a root security virtual machine monitor (VMM) of the computing device 100 and creates associated attestation information. The attestation information may be embodied as any information that may prove the authenticity of the root security VMM, such as a cryptographic quote of the root security VMM. The VMM is measured using a hardware root of trust other than the secure enclave support 124 of the processor 120. The other hardware root of trust may be, for example, a hardware trusted platform module (TPM), a firmware TPM, a converged security and manageability engine (CSME), or other hardware device. The computing device 100 may use any technique to measure the root security VMM. For example, the computing device 100 may boot into a trusted firmware using a trusted boot process and then measure the VMM from the trusted firmware. The attestation information may be stored in or by the security engine 134, for example in a trusted platform module of the computing device 100.

In block 804, the computing device 100 boots the root security VMM. The root security VMM may be embodied as any VMM, hypervisor, or other control structure of the computing device 100 that executes in a host virtualization mode, such as the VMX root mode. In block 806, the root security VMM enables a non-exiting capability of the processor 120 for requesting attestation information from the VMM. As described further below, the non-exiting capability may allow certain guest-level software to perform VMM-level operations without generating a virtual machine exit to the VMM. In some embodiments, in block 808 the computing device 100 may enable the non-exiting capability for a processor 120 instruction such as EREPORTVMX.

IN block 810, the root security VMM loads one or more operating system partitions and associated operating systems. The operating systems may execute in a guest virtualization mode (e.g., in the VMX non-root mode), with security protection provided by the root security VMM. In some embodiments, the root security VMM may also load one or more protection domains, which may be embodied as guest software that is isolated or otherwise protected by the root security VMM using the virtualization support 122. In some embodiments, the root security VMM may delegate one or more root-level operations to a protection domain.

In block 812, one or more of the operating system partitions may load user-level secure enclaves. The secure enclaves may be embodied as ring-3 code that is protected by the secure enclave support 124 of the processor 120. In some embodiments, in block 814, the computing device 100 may load a VMX verification enclave (VVE) 218. The VVE 218 may be embodied as a special secure enclave that is permitted to request attestation information from the root security VMM. In some embodiments, the computing device 100 may load only one specific VVE 218.

In block 816, a secure enclave such as the VVE 218 requests attestation information for the root security VMM. The attestation information may be embodied as any information that proves the authenticity of the root security VMM, as well as the locality of the root security VMM to the computing device 100. For example, executing a processor 120 instruction to request the attestation information may prove the locality of the root security VMM, that is, that the VVE 218 and the VMM are operational on the same computing device 100. In some embodiments, in block 818 the VVE 218 may execute the ERPORTVMX instruction to copy the attestation information (the quote for the root security VMM) from a field identified in the virtual machine control structure (VMCS). During execution, the processor 120 may verify that the attestation information has been requested by a secure enclave that is permitted to request attestation information. If verified, the processor 120 provides the attestation information to the calling secure enclave. One embodiment of a method for executing the ERPORTVMX instruction is described below in connection with FIG. 9. Although described as communicating the attestation information via the VMCS, the computing device 100 may exchange the attestation information with the enclave through one or more registers of the processor 120 (such as a bank of XMM/YMM registers).

In block 820, the VVE 218 verifies the attestation information for the root security VMM with a remote attestation server. After executing the EREPORTVMX instruction, the VVE 218 may use the received attestation information, re-sign the received attestation information with a previously provisioned server key to indicate that the correct VVE 218 has possession of the attestation information, and send the attestation information to the remote attestation server for attestation of the local root security VMM. As in general attestation models using a hardware root of trust, the verification may be performed by an attestation server (such as an SGX attestation server). The remote attestation sever verifies that the attested secure enclave (e.g., the VVE 218) is operating on a computing device 100 with a specific (measured) root security VMM. The VVE 218 receives a response from the server indicating whether the attestation information was verified. Thus, the locality check provided by the EREPORTVMX instruction effectively binds the root security VMM present on the computing device 100 (which has control over virtualization technology such as Intel® VT-x) to the SGX enclave VVE 218 issuing the instruction and vice versa. In block 822, the computing device 100 determines whether the attestation information was verified. If not, the method 800 loops back to block 816, in which the VVE 218 may continue to request attestation information. If the attestation information was verified, the method 800 advances to block 824.

In block 824, the VVE 218 provides a shared secret, such as an encryption key, to the root security VMM. The VVE 218 and the root security VMM may use the shared secret to establish a secure communication channel. The root security VMM may also use this new instruction-based (and locality checked) key exchange channel to setup other shared key material to allow other locally secured forms of I/O communication between delegated software components operating in VMM-protected contexts (e.g., ring-0 drivers in guest protection domains) and SGX-protected secure enclaves. In some embodiments, in block 826, the VVE 218 may execute a processor 120 instruction ESETKEYVMM to write a session key into a field of the VMCS. The session key may be used for future data exchange between the VVE 218 (and any other SGX enclave that can communicate with the VVE 218) and the VMM-protected software elements that receive the shared keys (e.g., the root security VMM, ring-0 drivers, or other VMM-protected elements). For example, a VMM-protected device driver may use the session key to securely provide I/O data to a secure enclave for processing. After providing the shared secret to the root security VMM, the method 800 loops back to block 816, in which the VVE 218 may continue to request attestation information.

Figure 9:
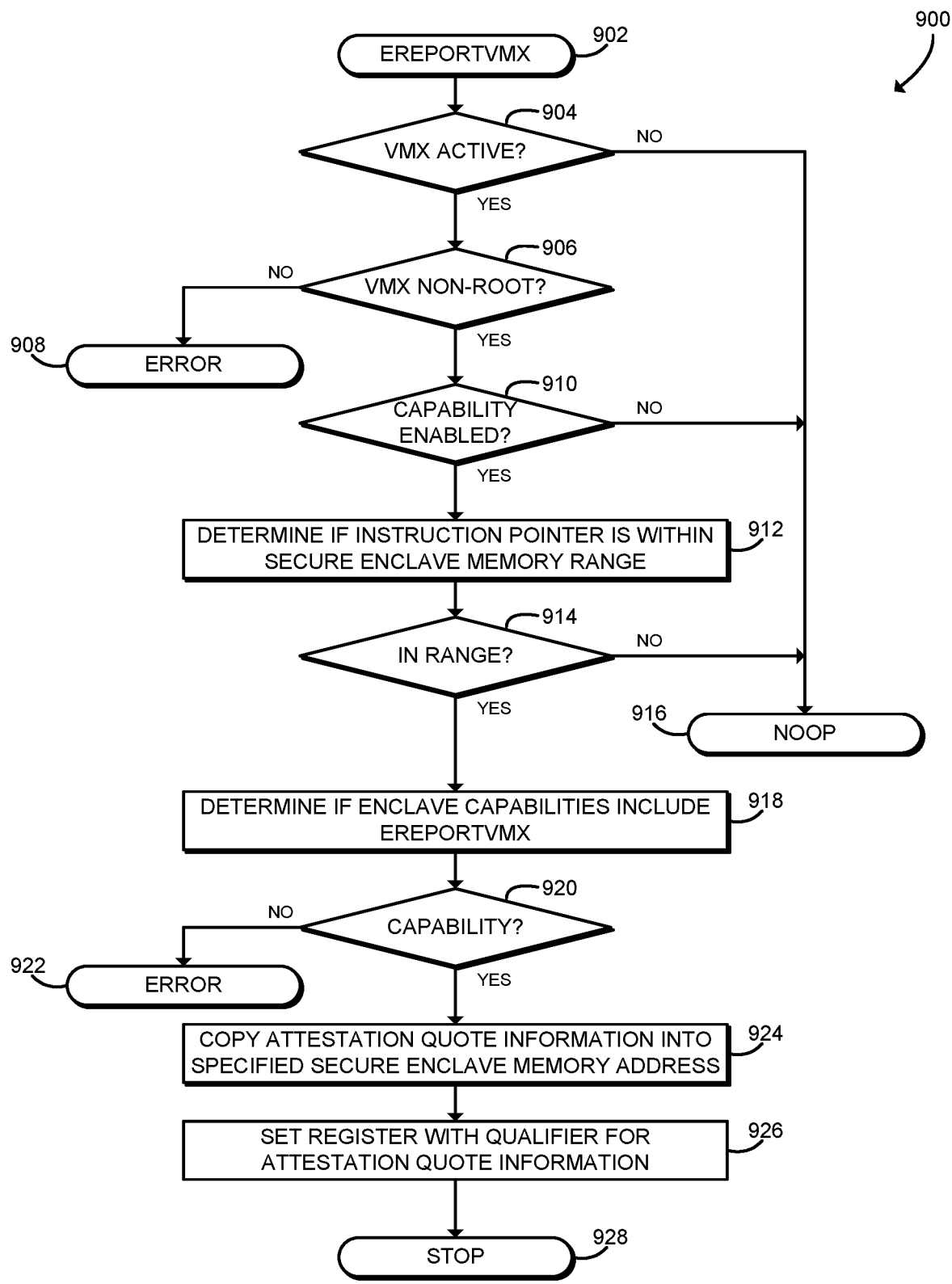
FIG. 9 is a simplified flow diagram of at least one embodiment of a method for reporting attestation information that may be executed by the computing device of FIGS. 1-2.

Referring now to FIG. 9, in use, the computing device 100 may execute a method 900 for reporting attestation information. The method 900 may be executed by hardware, firmware, microcode, or other execution resources of the processor 120 and thus may use the processor 120 hardware as it root of trust. The method 900 begins in block 902, in which the computing device 100 executes the ERPORTVMX instruction with the processor 120. Illustratively, the ERPORTVMX instruction may be embodied as an SGX user-mode instruction (or an extension of an existing instruction). In some embodiments, a new leaf for the VMFUNC instruction (an instruction that does not VM exit and provides CPU services to VMX non-root mode software) may also be used for this instruction. The ERPORTVMX instruction (or the leaf of the VMFUNC instruction) may use the EAX register for the operation leaf, the EBX register for parameters, and the ECX register for output. In some embodiments, leaf 1 may correspond to an instruction to get a quote that is setup by the root security VMM in the VMCS. In those embodiments, EAX may equal 1 (the operation), EBX may equal a page-aligned address in enclave memory (data) region, and ECX may equal a value that receives nonce, version, or other qualifiers.

In block 904, the processor 120 determines whether the virtualization support 122 (e.g., Intel® VT-x or VT-d technology) is active. If not, the method 900 branches ahead to block 916, in which the processor 120 executes a no-operation. After executing the no-operation, the method 900 is completed. Referring back to block 904, if the virtualization support 122 is active, the method 900 branches ahead to block 906.

In block 906, the processor 120 determines whether the processor 120 is executing in VMX non-root mode (i.e., whether the processor 120 is executing guest software such as a guest operating system or a secure enclave hosted by a guest operating system). If not, (i.e., if executing in VMX root mode) the method 900 branches to block 908, in which the processor 120 generates an error. For example, the processor 120 may raise an invalid operation exception. Referring back to block 906, if the processor 120 is executing in VMX non-root mode, the method 900 advances to block 910.

In block 910, the processor 120 determines whether a non-exit capability has been enabled for the EREPORTVMX instruction. EREPORTVMX may be embodied as a non-exiting instruction. In other words, the EREPORTVMX instruction does not generate a VM exit (similar to VMFUNC). As a non-exiting instruction, the EREPORTVMX instruction cannot be virtualized by the root security VMM, and thus can only be activated by the root security VMM for operation from the guest. If the non-exit capability has not been enabled by the VMM, the method 900 branches ahead to block 916, in which the processor 120 executes a no-operation, as described above, without generating a VM exit. If the non-exit capability has been enabled, the method 900 advances to block 912.

In block 912, the processor 120 determines whether the current instruction pointer is within a secure enclave memory range. The information returned by the EREPORTVMX instruction is only valid when the processor 120 is operating in secure enclave mode. In block 914, the computing device 100 checks whether the instruction pointer is in the secure enclave memory range. If not, the method 900 branches ahead to block 916, in which the processor 120 executes a no-operation, as described above. Thus, use of the EREPORTVMX instruction in non-secure-enclave mode may behave as a legacy NO-OP. Referring back to block 914, if the instruction pointer is within a secure enclave memory range, the method 900 advances to block 918.

In block 918, the processor 120 determines if the capabilities of the current secure enclave (i.e., the secure enclave associated with the current instruction pointer) include EREPORTVMX. In some embodiments, only a particular enclave (or enclaves) that performs the function of the VVE 218 has the architectural capability to issue the EREPORTVMX instruction. Other enclaves do not have this capability. This restriction may prevent this capability from being misused to detect hardware virtualization, and may also keep the attestation of VVEs 218 manageable. In block 920, the processor 120 checks whether the capabilities include EREPORTVMX. If not, the method 900 branches to block 922, in which the processor 120 generates an error. For example, the processor 120 may raise a general protection fault. Referring back to block 920, if the capabilities include EREPORTVMX, the method 900 advances to block 924.

In block 924, the processor 120 copies attestation quote information into a specified secure enclave memory address. The processor 120 may copy the attestation information from the active virtual machine control structure (VMCS) on the logical processor that the instruction is executed. Thus, copying the data from the VMCS a locality check by reporting information directly from the active VMCS. The VMCS is managed by the root security VMM on the computing device 100. In the illustrative embodiment, the root security VMM is a separate trusted entity not in the TCB for the VVE 218; rather, the VVE 218 is trying to mutually authenticate with the root secure VMM and ensure that the root security VMM co-exists on the same local computing device 100. In block 926, the processor 120 sets a register with a qualifier for the attestation quote information. The qualifier may be embodied as a version, nonce, or other identifying information. In some embodiments, the qualifier may be used by the VVE 218 to derive a shared session key. In block 928, the method 900 is completed. Execution of the computing device 100 may return to an invoking secure enclave (e.g. the VVE 218), which may verify the attestation quote information, as described above in connection with FIG. 8.

Referring now to FIG. 10, pseudocode 1000 illustrates one potential embodiment of the method 900 of FIG. 9. Pseudocode 1000 may be implemented using microcode and/or hardware resources of the processor 120, and may be executed in response to invocation of the EREPORTVMX instruction. As shown, the pseudocode 1000 performs several sanity checks to determine if the instruction was executed in VMX non-root mode from the correct secure enclave, and if those checks pass, copies a quote blob (including the attestation information) into the secure enclave memory.

It should be appreciated that, in some embodiments, the methods 300, 500, 600, 700, 700, and/or 800 may be embodied as various instructions stored on a computer-readable media, which may be executed by the processor 120, the I/O subsystem 126, and/or other components of the computing device 100 to cause the computing device 100 to perform the corresponding method 300, 500, 600, 700, 700, and/or 800. The computer-readable media may be embodied as any type of media capable of being read by the computing device 100 including, but not limited to, the memory 128, the data storage device 130, firmware devices, and/or other media.

EXAMPLES

Illustrative examples of the technologies disclosed herein are provided below. An embodiment of the technologies may include any one or more, and any combination of, the examples described below.

Example 1 includes a computing device for end-to-end biometric authentication, the computing device comprising: a key exchange module to securely exchange a shared key between a biometric device driver of the computing device and an authentication secure enclave of the computing device, wherein the authentication secure enclave is established with secure enclave support of a processor of the computing device; a secure capture module to (i) receive, by the biometric device driver, biometric data from a biometric device of the computing device in a virtualization-protected memory buffer, wherein the virtualization-protected memory buffer is secured by hardware virtualization support of the processor of the computing device, and (ii) encrypt, by the biometric device driver, the biometric data with the shared key to generate encrypted biometric data, wherein the shared key is secured by the hardware virtualization support of the processor; and a biometric authentication module to (i) decrypt, by the authentication secure enclave, the encrypted biometric data with the shared key, and (ii) perform, by the authentication secure enclave, a biometric authentication operation based on the biometric data in response to decryption of the encrypted biometric data.

Example 2 includes the subject matter of Example 1, and wherein: the secure capture module is further to integrity-protect or replay-protect the biometric data with the shared key; and the biometric authentication module is further to verify the integrity or verify the liveness of the biometric data with the shared key.

Example 3 includes the subject matter of any of Examples 1 and 2, and wherein: to receive the biometric data from the biometric device comprises to capture iris camera data from an iris recognition device of the computing device; and to perform the biometric authentication operation comprises to perform an iris recognition process based on the iris camera data.

Example 4 includes the subject matter of any of Examples 1-3, and wherein to perform the biometric authentication operation comprises to enroll a user based on the biometric data.

Example 5 includes the subject matter of any of Examples 1-4, and wherein to enroll the user comprises to: generate a biometric template based on the biometric data; and encrypt the biometric template to generate an encrypted biometric template, wherein the encrypted biometric template is bound to the authentication secure enclave.

Example 6 includes the subject matter of any of Examples 1-5, and wherein to perform the biometric operation comprises to identify a user based on the biometric data.

Example 7 includes the subject matter of any of Examples 1-6, and wherein to identify the user based on the biometric data comprises to: decrypt an encrypted biometric template to generate a biometric template, wherein the encrypted biometric template is bound to the authentication secure enclave; and determine whether the biometric data matches the biometric template in response to decryption of the encrypted biometric template.

Example 8 includes the subject matter of any of Examples 1-7, and wherein to identify the user based on the biometric data further comprises to update the encrypted biometric template based on whether the biometric data matches the biometric template.

Example 9 includes the subject matter of any of Examples 1-8, and wherein the secure capture module is further to allocate the virtualization-protected memory buffer in a memory range that is inaccessible to an operating system of the computing device.

Example 10 includes the subject matter of any of Examples 1-9, and wherein to allocate the virtualization-protected memory buffer comprises to allocate the virtualization-protected memory buffer using extended page tables of the computing device.

Example 11 includes the subject matter of any of Examples 1-10, and wherein the secure capture module is further to allocate the virtualization-protected memory buffer in a memory range that is accessible via a device direct memory access only to the biometric device.

Example 12 includes a computing device for platform locality assertion, the computing device comprising: a measurement module to measure a virtual machine monitor of the computing device to generate virtual machine monitor attestation data; a locality assertion module to (i) execute, by a secure enclave of the computing device, a virtualization report instruction with a processor of the computing device, wherein the secure enclave is established with secure enclave support of the processor, and (ii) copy the virtual machine monitor attestation data into secure enclave memory of the secure enclave in response to execution of the virtualization report instruction; and an attestation module to perform, by the secure enclave, a remote attestation operation based on the virtual machine monitor attestation data.

Example 13 includes the subject matter of Example 12, and wherein to copy the virtual machine monitor attestation data comprises to copy the virtual machine monitor attestation data without generation of a virtual machine exit.

Example 14 includes the subject matter of any of Examples 12 and 13, and wherein the locality assertion module is further to enable a non-exiting capability of the processor associated with the virtualization report instruction.

Example 15 includes the subject matter of any of Examples 12-14, and wherein to copy the virtual machine monitor attestation data comprises to copy the virtual machine monitor attestation data from a field of a virtual machine control structure into the secure enclave memory, wherein the virtual machine control structure is managed by the virtual machine monitor with hardware virtualization support of the processor of the computing device.

Example 16 includes the subject matter of any of Examples 12-15, and wherein the locality assertion module is further to: determine whether the secure enclave is permitted to execute the virtualization report instruction in response to execution of the virtualization report instruction; wherein to copy the virtual machine monitor attestation data comprises to copy the virtual machine monitor attestation data in response to a determination that the secure enclave is permitted to execute the virtualization report instruction.

Example 17 includes the subject matter of any of Examples 12-16, and wherein the locality assertion module is further to: execute, by the secure enclave, a virtualization set key instruction with the processor in response to performing the remote attestation operation; and copy a shared secret from the secure enclave memory of the secure enclave to the virtual machine monitor in response to execution of the virtualization set key instruction.

Example 18 includes the subject matter of any of Examples 12-17, and wherein to copy the shared secret comprises to copy the shared secret from the secure enclave memory into a virtual machine control structure, wherein the virtual machine control structure is managed by the virtual machine monitor with hardware virtualization support of the processor of the computing device.

Example 19 includes the subject matter of any of Examples 12-18, and wherein to measure the virtual machine monitor comprises to: measure the virtual machine monitor by a trusted firmware component of the computing device; and store the virtual machine monitor attestation data in a trusted platform module of the computing device in response to measurement of the virtual machine monitor.

Example 20 includes the subject matter of any of Examples 12-19, and wherein the attestation module is further to load the secure enclave as a user-level component of the computing device protected by the secure enclave support of the processor.

Example 21 includes a method for end-to-end biometric authentication, the method comprising: securely exchanging, by a computing device, a shared key between a biometric device driver of the computing device and an authentication secure enclave of the computing device, wherein the authentication secure enclave is established with secure enclave support of a processor of the computing device; receiving, by the biometric device driver, biometric data from a biometric device of the computing device in a virtualization-protected memory buffer, wherein the virtualization-protected memory buffer is secured by hardware virtualization support of the processor of the computing device; encrypting, by the biometric device driver, the biometric data with the shared key to generate encrypted biometric data, wherein the shared key is secured by the hardware virtualization support of the processor; decrypting, by the authentication secure enclave, the encrypted biometric data with the shared key; and performing, by the authentication secure enclave, a biometric authentication operation based on the biometric data in response to decrypting the encrypted biometric data.

Example 22 includes the subject matter of Example 21, and further comprising: integrity-protecting or replay-protecting the biometric data with the shared key by the biometric device driver; and verifying the integrity the liveness of the biometric data by the authentication secure enclave with the shared key.

Example 23 includes the subject matter of any of Examples 21 and 22, and wherein: receiving the biometric data from the biometric device comprises capturing iris camera data from an iris recognition device of the computing device; and performing the biometric authentication operation comprises performing an iris recognition process based on the iris camera data.

Example 24 includes the subject matter of any of Examples 21-23, and wherein performing the biometric authentication operation comprises enrolling a user based on the biometric data.

Example 25 includes the subject matter of any of Examples 21-24, and wherein enrolling the user comprises: generating a biometric template based on the biometric data; and encrypting the biometric template to generate an encrypted biometric template, wherein the encrypted biometric template is bound to the authentication secure enclave.

Example 26 includes the subject matter of any of Examples 21-25, and wherein performing the biometric operation comprises identifying a user based on the biometric data.

Example 27 includes the subject matter of any of Examples 21-26, and wherein identifying the user based on the biometric data comprises: decrypting an encrypted biometric template to generate a biometric template, wherein the encrypted biometric template is bound to the authentication secure enclave; and determining whether the biometric data matches the biometric template in response to decrypting the encrypted biometric template.

Example 28 includes the subject matter of any of Examples 21-27, and wherein identifying the user based on the biometric data further comprises updating the encrypted biometric template based on whether the biometric data matches the biometric template.

Example 29 includes the subject matter of any of Examples 21-28, and further comprising allocating, by the computing device, the virtualization-protected memory buffer in a memory range that is inaccessible to an operating system of the computing device.

Example 30 includes the subject matter of any of Examples 21-29, and wherein allocating the virtualization-protected memory buffer comprises allocating the virtualization-protected memory buffer using extended page tables of the computing device.

Example 31 includes the subject matter of any of Examples 21-30, and further comprising allocating, by the computing device, the virtualization-protected memory buffer in a memory range that is accessible via a device direct memory access only to the biometric device.

Example 32 includes a method for platform locality assertion, the method comprising: measuring, by a computing device, a virtual machine monitor of the computing device to generate virtual machine monitor attestation data; executing, by a secure enclave of the computing device, a virtualization report instruction with a processor of the computing device, wherein the secure enclave is established with secure enclave support of the processor; copying, by the computing device, the virtual machine monitor attestation data into secure enclave memory of the secure enclave in response to executing the virtualization report instruction; and performing, by the secure enclave, a remote attestation operation based on the virtual machine monitor attestation data.

Example 33 includes the subject matter of Example 32, and wherein copying the virtual machine monitor attestation data comprises copying the virtual machine monitor attestation data without generating a virtual machine exit.

Example 34 includes the subject matter of any of Examples 32 and 33, and further comprising enabling, by the computing device, a non-exiting capability of the processor associated with the virtualization report instruction.

Example 35 includes the subject matter of any of Examples 32-34, and wherein copying the virtual machine monitor attestation data comprises copying the virtual machine monitor attestation data from a field of a virtual machine control structure into the secure enclave memory, wherein the virtual machine control structure is managed by the virtual machine monitor using hardware virtualization support of the processor of the computing device.

Example 36 includes the subject matter of any of Examples 32-35, and further comprising: determining, by the processor, whether the secure enclave is permitted to execute the virtualization report instruction in response to executing the virtualization report instruction; wherein copying the virtual machine monitor attestation data comprises copying the virtual machine monitor attestation data in response to determining that the secure enclave is permitted to execute the virtualization report instruction.

Example 37 includes the subject matter of any of Examples 32-36, and further comprising: executing, by the secure enclave, a virtualization set key instruction with the processor in response to performing the remote attestation operation; and copying, by the computing device, a shared secret from the secure enclave memory of the secure enclave to the virtual machine monitor in response to executing the virtualization set key instruction.

Example 38 includes the subject matter of any of Examples 32-37, and wherein copying the shared secret comprises copying the shared secret from the secure enclave memory into a virtual machine control structure, wherein the virtual machine control structure is managed by the virtual machine monitor using hardware virtualization support of the processor of the computing device.

Example 39 includes the subject matter of any of Examples 32-38, and wherein measuring the virtual machine monitor comprises: measuring the virtual machine monitor by a trusted firmware component of the computing device; and storing the virtual machine monitor attestation data in a trusted platform module of the computing device in response to measuring the virtual machine monitor.

Example 40 includes the subject matter of any of Examples 32-39, and further comprising loading, by the computing device, the secure enclave as a user-level component of the computing device protected by the secure enclave support of the processor.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for end-to-end biometric authentication, the computing device comprising: means for securely exchanging a shared key between a biometric device driver of the computing device and an authentication secure enclave of the computing device, wherein the authentication secure enclave is established with secure enclave support of a processor of the computing device; means for receiving, by the biometric device driver, biometric data from a biometric device of the computing device in a virtualization-protected memory buffer, wherein the virtualization-protected memory buffer is secured by hardware virtualization support of the processor of the computing device; means for encrypting, by the biometric device driver, the biometric data with the shared key to generate encrypted biometric data, wherein the shared key is secured by the hardware virtualization support of the processor; means for decrypting, by the authentication secure enclave, the encrypted biometric data with the shared key; and means for performing, by the authentication secure enclave, a biometric authentication operation based on the biometric data in response to decrypting the encrypted biometric data.

Example 45 includes the subject matter of Example 44, and further comprising: means for integrity-protecting or replay-protecting the biometric data with the shared key by the biometric device driver; and means for verifying the integrity the liveness of the biometric data by the authentication secure enclave with the shared key.

Example 46 includes the subject matter of any of Examples 44 and 45, and wherein: the means for receiving the biometric data from the biometric device comprises means for capturing iris camera data from an iris recognition device of the computing device; and the means for performing the biometric authentication operation comprises means for performing an iris recognition process based on the iris camera data.

Example 47 includes the subject matter of any of Examples 44-46, and wherein the means for performing the biometric authentication operation comprises means for enrolling a user based on the biometric data.

Example 48 includes the subject matter of any of Examples 44-47, and wherein the means for enrolling the user comprises: means for generating a biometric template based on the biometric data; and means for encrypting the biometric template to generate an encrypted biometric template, wherein the encrypted biometric template is bound to the authentication secure enclave.

Example 49 includes the subject matter of any of Examples 44-48, and wherein the means for performing the biometric operation comprises means for identifying a user based on the biometric data.

Example 50 includes the subject matter of any of Examples 44-49, and wherein the means for identifying the user based on the biometric data comprises: means for decrypting an encrypted biometric template to generate a biometric template, wherein the encrypted biometric template is bound to the authentication secure enclave; and means for determining whether the biometric data matches the biometric template in response to decrypting the encrypted biometric template.

Example 51 includes the subject matter of any of Examples 44-50, and wherein the means for identifying the user based on the biometric data further comprises means for updating the encrypted biometric template based on whether the biometric data matches the biometric template.

Example 52 includes the subject matter of any of Examples 44-51, and further comprising means for allocating the virtualization-protected memory buffer in a memory range that is inaccessible to an operating system of the computing device.

Example 53 includes the subject matter of any of Examples 44-52, and wherein the means for allocating the virtualization-protected memory buffer comprises means for allocating the virtualization-protected memory buffer using extended page tables of the computing device.

Example 54 includes the subject matter of any of Examples 44-53, and further comprising means for allocating the virtualization-protected memory buffer in a memory range that is accessible via a device direct memory access only to the biometric device.

Example 55 includes a computing device for platform locality assertion, the computing device comprising: means for measuring a virtual machine monitor of the computing device to generate virtual machine monitor attestation data; means for executing, by a secure enclave of the computing device, a virtualization report instruction with a processor of the computing device, wherein the secure enclave is established with secure enclave support of the processor; means for copying the virtual machine monitor attestation data into secure enclave memory of the secure enclave in response to executing the virtualization report instruction; and means for performing, by the secure enclave, a remote attestation operation based on the virtual machine monitor attestation data.

Example 56 includes the subject matter of Example 55, and wherein the means for copying the virtual machine monitor attestation data comprises means for copying the virtual machine monitor attestation data without generating a virtual machine exit.

Example 57 includes the subject matter of any of Examples 55 and 56, and further comprising means for enabling a non-exiting capability of the processor associated with the virtualization report instruction.

Example 58 includes the subject matter of any of Examples 55-57, and wherein the means for copying the virtual machine monitor attestation data comprises means for copying the virtual machine monitor attestation data from a field of a virtual machine control structure into the secure enclave memory, wherein the virtual machine control structure is managed by the virtual machine monitor using hardware virtualization support of the processor of the computing device.

Example 59 includes the subject matter of any of Examples 55-58, and further comprising: means for determining, by the processor, whether the secure enclave is permitted to execute the virtualization report instruction in response to executing the virtualization report instruction; wherein the means for copying the virtual machine monitor attestation data comprises means for copying the virtual machine monitor attestation data in response to determining that the secure enclave is permitted to execute the virtualization report instruction.

Example 60 includes the subject matter of any of Examples 55-59, and further comprising: means for executing, by the secure enclave, a virtualization set key instruction with the processor in response to performing the remote attestation operation; and means for copying a shared secret from the secure enclave memory of the secure enclave to the virtual machine monitor in response to executing the virtualization set key instruction.

Example 61 includes the subject matter of any of Examples 55-60, and wherein the means for copying the shared secret comprises means for copying the shared secret from the secure enclave memory into a virtual machine control structure, wherein the virtual machine control structure is managed by the virtual machine monitor using hardware virtualization support of the processor of the computing device.

Example 62 includes the subject matter of any of Examples 55-61, and wherein the means for measuring the virtual machine monitor comprises: means for measuring the virtual machine monitor by a trusted firmware component of the computing device; and means for storing the virtual machine monitor attestation data in a trusted platform module of the computing device in response to measuring the virtual machine monitor.

Example 63 includes the subject matter of any of Examples 55-62, and further comprising means for loading the secure enclave as a user-level component of the computing device protected by the secure enclave support of the processor.

The invention claimed is:

1. A computing device for platform locality assertion, the computing device comprising:
   a measurement module to measure a virtual machine monitor of the computing device to generate virtual machine monitor attestation data;
   a locality assertion module to (i) execute, by a secure enclave of the computing device, a virtualization report instruction with a processor of the computing device, wherein the secure enclave is established with secure enclave support of the processor, and (ii) copy the virtual machine monitor attestation data into secure enclave memory of the secure enclave in response to execution of the virtualization report instruction and without generation of a virtual machine exit; and
   an attestation module to perform, by the secure enclave, a remote attestation operation based on the virtual machine monitor attestation data.

2. The computing device of claim 1, wherein the locality assertion module is further to enable a non-exiting capability of the processor associated with the virtualization report instruction.

3. The computing device of claim 1, wherein to copy the virtual machine monitor attestation data comprises to copy the virtual machine monitor attestation data from a field of a virtual machine control structure into the secure enclave memory, wherein the virtual machine control structure is managed by the virtual machine monitor with hardware virtualization support of the processor of the computing device.

4. The computing device of claim 1, wherein the locality assertion module is further to:
   determine whether the secure enclave is permitted to execute the virtualization report instruction in response to execution of the virtualization report instruction;
   wherein to copy the virtual machine monitor attestation data comprises to copy the virtual machine monitor attestation data in response to a determination that the secure enclave is permitted to execute the virtualization report instruction.

5. The computing device of claim 1, wherein the locality assertion module is further to:
   execute, by the secure enclave, a virtualization set key instruction with the processor in response to performing the remote attestation operation; and
   copy a shared secret from the secure enclave memory of the secure enclave to the virtual machine monitor in response to execution of the virtualization set key instruction.

6. The computing device of claim 5, wherein to copy the shared secret comprises to copy the shared secret from the secure enclave memory into a virtual machine control structure, wherein the virtual machine control structure is managed by the virtual machine monitor with hardware virtualization support of the processor of the computing device.

7. The computing device of claim 1, wherein to measure the virtual machine monitor comprises to:
   measure the virtual machine monitor by a trusted firmware component of the computing device; and
   store the virtual machine monitor attestation data in a trusted platform module of the computing device in response to measurement of the virtual machine monitor.

8. The computing device of claim 1, wherein the attestation module is further to load the secure enclave as a user-level component of the computing device protected by the secure enclave support of the processor.

9. A method for platform locality assertion, the method comprising:
   measuring, by a computing device, a virtual machine monitor of the computing device to generate virtual machine monitor attestation data;
   executing, by a secure enclave of the computing device, a virtualization report instruction with a processor of the computing device, wherein the secure enclave is established with secure enclave support of the processor;
   copying, by the computing device, the virtual machine monitor attestation data into secure enclave memory of the secure enclave in response to executing the virtualization report instruction and without generating a virtual machine exit; and
   performing, by the secure enclave, a remote attestation operation based on the virtual machine monitor attestation data.

10. The method of claim 9, wherein copying the virtual machine monitor attestation data comprises copying the virtual machine monitor attestation data from a field of a virtual machine control structure into the secure enclave memory, wherein the virtual machine control structure is managed by the virtual machine monitor using hardware virtualization support of the processor of the computing device.

11. The method of claim 9, further comprising:
   determining, by the processor, whether the secure enclave is permitted to execute the virtualization report instruction in response to executing the virtualization report instruction;
   wherein copying the virtual machine monitor attestation data comprises copying the virtual machine monitor attestation data in response to determining that the secure enclave is permitted to execute the virtualization report instruction.

12. The method of claim 9, further comprising:
executing, by the secure enclave, a virtualization set key instruction with the processor in response to performing the remote attestation operation; and
copying, by the computing device, a shared secret from the secure enclave memory of the secure enclave to the virtual machine monitor in response to executing the virtualization set key instruction.

13. One or more machine readable storage media comprising a plurality of instructions that in response to being executed cause a computing device to:
measure a virtual machine monitor of the computing device to generate virtual machine monitor attestation data;
execute, by a secure enclave of the computing device, a virtualization report instruction with a processor of the computing device, wherein the secure enclave is established with secure enclave support of the processor;
copy the virtual machine monitor attestation data into secure enclave memory of the secure enclave in response to executing the virtualization report instruction and without generating a virtual machine exit; and
perform, by the secure enclave, a remote attestation operation based on the virtual machine monitor attestation data.

14. The one or more machine readable storage media of claim 13, wherein to copy the virtual machine monitor attestation data comprises to copy the virtual machine monitor attestation data from a field of a virtual machine control structure into the secure enclave memory, wherein the virtual machine control structure is managed by the virtual machine monitor using hardware virtualization support of the processor of the computing device.

15. The one or more machine readable storage media of claim 13, further comprising a plurality of instructions that in response to being executed cause the computing device to:
determine, by the processor, whether the secure enclave is permitted to execute the virtualization report instruction in response to executing the virtualization report instruction;
wherein to copy the virtual machine monitor attestation data comprises to copy the virtual machine monitor attestation data in response to determining that the secure enclave is permitted to execute the virtualization report instruction.

16. The one or more machine readable storage media of claim 13, further comprising a plurality of instructions that in response to being executed cause the computing device to:
execute, by the secure enclave, a virtualization set key instruction with the processor in response to performing the remote attestation operation; and
copy a shared secret from the secure enclave memory of the secure enclave to the virtual machine monitor in response to executing the virtualization set key instruction.

17. The one or more machine readable storage media of claim 16, wherein to copy the shared secret comprises to copy the shared secret from the secure enclave memory into a virtual machine control structure, wherein the virtual machine control structure is managed by the virtual machine monitor using hardware virtualization support of the processor of the computing device.

* * * * *